United States Patent
Comaskey et al.

(10) Patent No.: US 7,212,558 B2
(45) Date of Patent: May 1, 2007

(54) LIQUID HEAT CAPACITY LASERS

(75) Inventors: Brian J. Comaskey, Walnut Creek, CA (US); Karl F. Scheibner, Tracy, CA (US); Earl R. Ault, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 139 days.

(21) Appl. No.: 10/836,925

(22) Filed: Apr. 30, 2004

(65) Prior Publication Data

US 2005/0243883 A1    Nov. 3, 2005

(51) Int. Cl.
*H01S 3/04* (2006.01)
*H01S 3/20* (2006.01)
*H01S 3/091* (2006.01)

(52) U.S. Cl. ............................ 372/51; 372/35; 372/70
(58) Field of Classification Search ................. 372/35, 372/51, 70
See application file for complete search history.

(56) References Cited

U.S. PATENT DOCUMENTS

| | | | | |
|---|---|---|---|---|
| 5,526,372 A * | 6/1996 | Albrecht et al. | ............... | 372/69 |
| 6,690,696 B2 * | 2/2004 | Byren et al. | ................... | 372/35 |
| 6,795,464 B2 * | 9/2004 | Lawandy | ...................... | 372/39 |
| 6,931,046 B1 * | 8/2005 | Ault | ............................ | 372/51 |
| 2003/0206568 A1 * | 11/2003 | Comaskey et al. | ........... | 372/51 |

* cited by examiner

*Primary Examiner*—Minsun Harvey
*Assistant Examiner*—Marcia A. Golub
(74) *Attorney, Agent, or Firm*—John P. Wooldridge; John H. Lee

(57) ABSTRACT

The heat capacity laser concept is extended to systems in which the heat capacity lasing media is a liquid. The laser active liquid is circulated from a reservoir (where the bulk of the media and hence waste heat resides) through a channel so configured for both optical pumping of the media for gain and for light amplification from the resulting gain.

11 Claims, 1 Drawing Sheet

LIQUID HEAT CAPACITY LASERS

The United States Government has rights in this invention pursuant to Contract No. W-7405ENG-48 between the United States Department of Energy and the University of California for the operation of Lawrence Livermore National Laboratory.

BACKGROUND OF THE INVENTION

1. Field of the Invention

The present invention relates to diode pumped heat capacity lasers. More specifically, it relates to the production of high-energy laser output from a liquid state laser operated in a heat capacity limited regime.

2. Description of Related Art

For continuous operation of medium to high average power lasers various heat exchanger systems, frequently with water flow loops and refrigeration units, have been used to handle the waste heat These cooling systems tend to be a significant (if not dominant) contribution to the laser system's mass, size, and average power consumption. There are a class of laser applications arising today that require minimal mass, volume, and peak electrical demand to support a given laser power. In this class there are a variety of applications in which the laser is to be operated only for an interval of time, followed by a longer period of time in which system recovery may be achieved; the so called "burst mode" laser. This is the basis of the concept of the heat capacity laser solid-state media (See U.S. Pat. No. 5,526,372, titled: "High Energy Bursts From A Solid State Laser Operated In The Heat Capacity Limited Regime," by Albrecht et al.). In the state of the art solid-state heat capacity system, the heat released during operation is stored in the lasing media itself, which is also thermally isolated. This isolation is used to reduce thermal gradients within the laser media. If allowed to form, these gradients severely limit the optical quality of the laser media.

Laser systems empowered by heat capacity technology have a high value at the present time. Practical laser weapons are militarily desirable. The systems receiving attention are heat capacity solid-state lasers. The solid-state heat capacity approach solves a variety of problems that the conventionally cooled laser poses when operated in the extremely high power regime. A thermally isolated media can be pumped much harder than a cooled media since there is so little heat conduction in the media, hence greatly reduced internal stresses (driven by temperature gradients). With greatly reduced thermal gradients, there are greatly reduced beam aberrations, which allow current adaptive optical technology to handle the residual distortions even in a 100,000 watt scale laser. A 100 kW actively cooled laser would need ~400 kW worth of cooling on the gain media. This will produce a very large concurrent power drain to the refrigeration unit as well require a big and heavy cooling unit This prevents the practical realization of mobile applications. In the heat capacity approach, cooling is separate from lasing, such that the cooling rate does not need to match the lasing media heating rate, allowing much smaller cooling systems and requiring power for cooling after the high laser power demand is gone.

A heat capacity laser is not simply a laser running with the cooling off. A heat capacity laser must be built according to principles laid out in the description of heat capacity lasers as explained in U.S. Pat. No. 5,526,372 For solid-state systems, the amount of gain media is more dependent on run time than on lasing cross section. Structures to hold the media must be reasonably thermally isolating in order to keep thermal conduction small. The on time will be dictated by the elevated temperature laser dynamics. The pumping scheme must be very uniform in the lasing beam cross-section plane.

SUMMARY OF THE INVENTION

It is an object of the present invention to provide high-energy laser output from a liquid state laser operated in a heat capacity limited regime.

This and other objects will be apparent based on the disclosure herein.

A common problem facing the design and application of high average power lasers is the need to reject a sizable amount of waste heat from the laser medium. For continuous operation there is no option but to have a cooling system rated at the full heat generation. For limited run times, there is another option: absorb the heat in some way and later, using a smaller cooling system, reject the heat in preparation for the next run period. This later laser option is referred to as a heat capacity laser.

The heat capacity laser as presently understood today is a solid-state laser (See U.S. Pat. No. 5,526,372, incorporated herein by reference). In the state of the art solid-state system, the heat released during operation is stored in the lasing media itself, which is also thermally isolated. This isolation is used to reduce thermal gradients within the laser media. If allowed to form, these gradients severely limit the optical quality of the laser media. This invention extends the heat capacity laser concept to high transverse flow liquid laser media. In a liquid heat capacity design of the present invention, the lasing waste heat is stored in the liquid reservoir away from the lasing action. Hence, unlike the solid-state case, the resulting temperature rise does not impact the optical quality of the gain region if proper mixing in the reservoir and liquid delivery system is achieved.

The issues and sensitivities differ between the established solid-state versions and the liquid state heat capacity laser of the present invention. The high transverse flow liquid designs of U.S. Pat. No. 6,339,608 and U.S. Pat. No. 6,438,151, both incorporated herein by reference, are implemented in embodiments of the present invention to address optical distortion control directly, whereas in the solid state, such optical control is a primary justification for the application of heat capacity technology. Heat capacity technology applied to the liquid state heat capacity laser technology has two architectural advantages over the solid state: 1) independence of heat capacity run time from the size of the gain zone and 2) the elimination of the need for a high level of thermal isolation of the gain medium. Shared with solid state heat capacity technology is the advantages of system size, weight, and peak power demand reductions in burst mode laser operation.

The present invention has a wide variety of applications, e.g., airborne laser defense weapons, tactical laser weapons, target designators, satellite communication, remote visualization and portable high power laser machining.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

Figure 1:
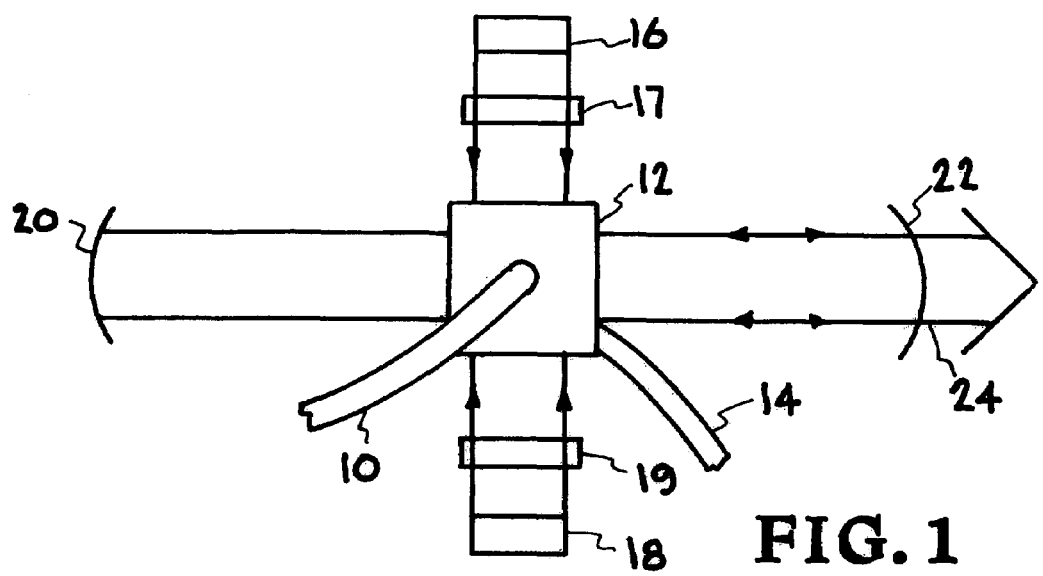
FIG. 1 shows the simple standing wave cavity and the simple pumping arrangement using diode stacks and cylindrical lenses.

In the present liquid heat capacity laser, the laser active liquid is circulated from a reservoir (where the bulk of the media and hence waste heat resides) through a channel so configured for both optical pumping of the media for gain and for light amplification from the resulting gain. The pumping is frequently done by (but not exclusively by) arc lamps, flash lamps, and laser diodes. The amplification may occur in the form of a laser oscillator or a laser amplifier. The pumping and lasing processes result in waste heat being deposited in the liquid media and a rise in the reservoir temperature over the run time of the laser. After lasing, the liquid media can be cooled back down to the start temperature at a slower rate than the heating rate by a refrigeration unit consequently smaller and drawing less power than a unit built to maintain the lasing media temperature while lasing. If time permits, even passive cooling could be utilized. For a lasing time of A and a dwell time B for restoring, the size and mass of the cooling system and the peak electrical power demand for active cooling could be reduced by roughly the ratio of A/B.

Unlike solid-state versions of heat capacity lasers, the maintenance of the optical quality of the lasing channel in a liquid heat capacity laser is separate from the heat capacity process. It is handled by the high transverse flow of the liquid. This is a subject of the other patents listed above. This simplifies the design of the liquid version since thermal isolation and special orientations and mountings of the media and pump sources are not mandated in order to keep good optical quality for the laser beam as in the solid-state case. Another particularly important decoupling is also achieved by switching to liquid heat capacity media. The lasing channel of the solid-state laser contains all the heat storage mass. A laser optimized design might demand less gain mass but it can't be obtained given the required waste heat storage requirement In the liquid case, one can optimize the amount of gain media since the bulk of the waste heat is stored in the reservoir. Given both a working solid state and liquid state heat capacity laser of the same power and burst duration, if it is desired to double the on time of the lasers, a complete redesign and rebuild of the solid state laser is required; however, in a liquid state laser, only the reservoir would have to be doubled. A further design simplification occurs in the liquid case since in the "dwell time" after the burst, the cooling of the media occurs at the reservoir which is remote from the lasing channel while in the solid state case, the cooling process must be engineered into the actual lasing channels.

Bulk damage to the laser media, such as accidental self focusing in the gain media, in the solid state case requires a major tear down of the system and the replacement of the expensive highly optically worked gain media. The equivalent event in the liquid case would be just bubble tracks in the liquid, which would clear. Damage to the glass or quartz flow channels would generally only necessitate a lifting or lowering of the cell in the laser channel. At the most, only minor realignment would be needed. A system tear down would be needed in the equivalent event of surface damage in a solid-state system. This would be followed by repolishing and recoating of the solid-state element Even if a cell was broken, the cost of the liquid media and the flow cells combined are much lower than the solid-state gain media's refurbishment cost Further, given the much more than order magnitude cost of the solid state media compared to the liquid media and flow cells, maintaining spares would be much more economical in the liquid case.

The burst mode approach was established in U.S. Pat. No. 5,526,372. However, that patent is conceived and expressed purely for solid-state media. The present invention extends burst mode heat capacity operation to the liquid state wherein a variety of operational problems and engineering issues differ distinctly in nature, severity, and solution from what was presented in the solid-state heat capacity laser.

1) Liquids do not support stress-induced birefringence so such issues do not enter into the design task.

2) Fracture limit is not a concern in the liquid state.

3) Liquids do have about 400 times the dn/dT (where n=index of refraction) of the solid state. Thus, high-speed laminar flow designs and uniform pumping for the liquid laser are important considerations. Optical quality control of the gain media is done by this flow control and by the fact that the pumping time on any slug of gain media is only for the transit time through the pump zone (~a level lifetime—in Nd doped Thionyl Cloride ~2350 ns). In conventional solid-state media, the corresponding characteristic time can be observed in the time it takes for the gain media to optically stabilize after turning on (by observing rod focus for example). This is typically of the order of a second. Hence high-speed liquid flow negates much of the dn/dT disadvantage with respect to the solid-state. Controlling details of the flow and diode pump light distribution provides finer quality control. Heat capacity arguments are not applied directly to optical quality issues in liquid heat capacity lasers. It is quite different for heat capacity solid-state lasers. Here, thermal isolation of the heating gain media is key to keeping heat conduction, hence thermal-optical distortion low.

4) Under lasing, the design described in U.S. Pat. No. 5,526,372 works to have no heat flow out of the gain channel while the present invention removes all of the heat out of the lasing channel by bulk material movement Both conduction and convection effects are avoided in the lasing channel by having the heat reservoir in a remote location while the heat storage in the solid state patent is in the lasing channel.

5) The bulk of the media used in this invention is not in the lasing channel at any given moment, while all of it is in the laser cavity in the patent This gives more flexibility to flowing liquid heat capacity designs. If in both approaches, you have a design for a particular power and run-time specification, consider what must be done if it is desired to now run for a longer time, say double. In the liquid case, the volume of the reservoir bottle is increased by two. In the laser design of U.S. Pat. No. 5,526,372, a major redesign is required. Basically, either the laser cavity must be redesigned to hold twice as much gain media (hence make it twice as long) or two laser cavities with combination optics must be built, (alternately, two amplifiers can be moved one then the other into the lasing cavity, which results in a non lasing period in the middle of operation).

6) Although thermal isolation of the gain media is important for the solid-state approach, because of the high flow rate, thermal isolation is unnecessary for this liquid approach. This is an engineering plus. In the liquid case instead of isolation to give media thermal uniformity, the solution is stirred in the reservoir to make it thermally homogeneous.

A small liquid laser based on Nd doped SOCL2 liquid laser media was built and operated under diode pumping at 1.25 W for periods of 30 minutes. The system was run in heat capacity mode with about 600 mL of solution in the off-line reservoir. The temperature was allowed to swing about 20 C. FIG. 1 shows the simple standing wave cavity and the simple pumping arrangement using diode stacks and cylindrical lenses. A liquid lasing medium is flowed though input tube 10 into cell 12 and out of the cell by output tube 14. Water cooled laser diode stacks 16 and 18, each with a cylindrical lens 17 and 19, respectively, provide pump light transverse to the flow of the laser medium as well as to the laser cavity, which is formed by high reflector 20 and output coupler 22. Based on this cavity configuration, an output beam 24 is produced. This laser was not optimized. The diode banks were multi-diode bars but probably only one bar focused to the lasing region. In any case this is the first case of continuous-wave (cw) operation and diode pumping of a Nd doped liquid system. Previously, optical distortion in the static liquid or the terribly designed flowed liquid (longitudinal flow) has prevented cw operation.

Figure 2A:
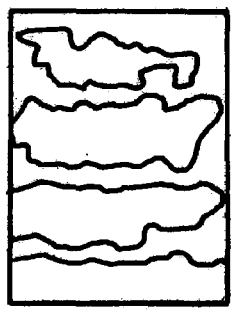
FIGS. 2A–F show interferometer based studies of flow cells under diode pump heat load.
Figure 2B:
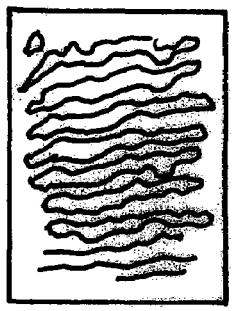
Figure 2C:
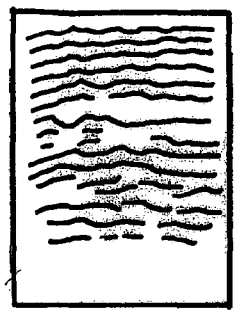
Figure 2D:
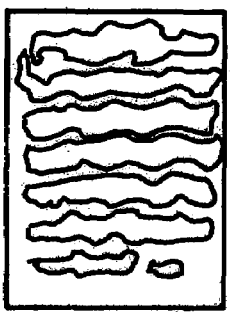
Figure 2E:
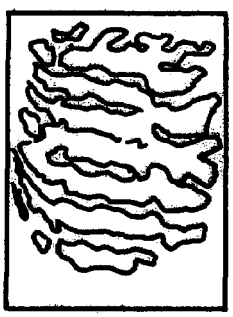
Figure 2F:
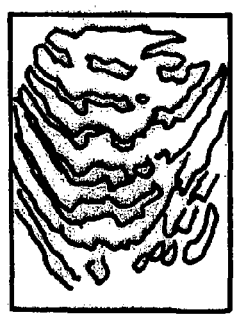

FIGS. 2A–F show interferometer based studies of flow cells under diode pump heat load. Note that no fringes would be observed under static conditions with the diodes on. In the top row (FIGS. 2A–C) and bottom row (FIGS. 2D–F), two cells are observed in a row under pumping. In the top case, the flow is from the bottom to the top. In FIG. 2A there is no diode pumping. FIG. 2B shows standard flow. More fringes (tilt) plus mild higher order distortions are observable. The present invention scales from this flow/pump condition. More fringes and greater higher order distortion are observed if the flow is slowed down by about a factor of 5. What is very interesting is the lower set wherein the cell in FIG. 2D flows bottom to top and the cell in FIG. 2E flows top to bottom. With these counter flowed cells, a fringe count increase across the frames is not observed, showing that counter flowed cells negate the large tilt per cell.

A good activator choice is Nd for the same reason it is the favorite of solid-state lasers. However, as with the solid state, other activators are likely, starting with those known to work in glasses. More will be found in the future.

The solvent SOCL2 is a very common industrial chemical, used heavily in Li-ion batteries by the military. It was chosen it because it is easy to get and handle. However, there are at least 12 other solvents in the literature that have or promise to support lasing. They are all largely aprotic liquids though some chelates have been demonstrated.

In sum, the liquid heat capacity laser performs the same tasks as the solid-state heat capacity laser but allows for better engineering separation in the subsystems required to make it work. This makes the liquid heat capacity laser superior in the vital area of laser packaging as well as cheaper to construct and optically more robust.

The following design considerations provide operation of a flowing liquid state laser in the heat capacity mode.

1) The approximate amount of laser energy obtainable from the flowing liquid gain media derives from the amount of heat energy that can be stored in the media. This heat energy can be related to the temperature rise of the media by way of the heat capacity of the liquid. We can express this as:

$$E_{heat} = (M_{in\ resonator} + M_{in\ reservoir})C_p \Delta T$$

where $C_p$ is the heat capacity of the liquid gain medium, $\Delta T$ is the bulk liquid temperature rise, $M_{in\ resonator}$ is the mass of the liquid gain medium within the laser's optical path, and $M_{in\ reservoir}$ is the laser gain medium in the circulation lines and liquid reservoir.

$M_{in\ resonator}$ is analog to the solid-state gain media in current state of the art solid-state heat capacity laser designs and $M_{in\ reservoir}$ is specific to circulated liquid systems. For circulated liquid systems, generally $M_{in\ reservoir} > M_{in\ resonator}$. The mass of the gain media within the laser action region is determined purely by lasing action optimization calculations. For a fixed $\Delta T$, a large range of heat storage values can be accommodated by adjusting the reservoir size. For current state of the art solid-state heat capacity lasers, a doubling of the ran time for the same laser power requires an entirely new laser design with twice the solid state gain media inside the resonator whereas in the high transverse flow liquid heat capacity laser, only the reservoir bottle needs to be doubled in size. It should be particularly noted that in practical heat capacity designs, the overwhelming bulk of the system mass does not reside in the lasing media. Hence, in going to very large heat sink values, the liquid laser approach, with it's simple choice of reservoir sizes, offers by far the easiest run time scaling.

The size of $\Delta T$ is set on the low temperature side firstly by the melting point temperature of the liquid and in practical designs possibly by the viscosity-temperature relationship or by the practically obtainable low temperature in a particular installation. For example, in Thionyl Chloride, the melting temperature is −104.5 degrees C., but for a military aircraft application one might not want to engineer the system for lower than, say −20 degrees C. One absolute upper temperature limit is set by level population redistribution effects. A Nd activated liquid system would generally show the same effect as a Nd activated solid-state system. This would set the upper temperature at about 1200 degrees C. Another possible limiter would be the liquid decomposition temperature. For Thionyl Chloride, this is 140 degrees C. For a standard atmosphere circulation system, the boiling temperature could also fix the upper temperature swing. In the case of Thionyl Chloride, this is indeed the case as the boiling point is 75.4 degrees C.

2) The relationship of released heat energy, $E_{heat}$, to the laser output energy $E_{out}$, for the Nd activated liquid state laser, is identical to the Nd activated solid state laser case.

$$E_{out} = (\epsilon_{extr}/\chi)E_{heat}$$

where $\epsilon_{extr}$ is the extraction efficiency of the laser device (design dependant) and $\chi$ is the ratio of energy released as heat to the energy in the upper lasing level (giving gain). This is used in the solid-state heat capacity concept to define a gain medium figure of merit (FOM):

$$FOM = (\epsilon_{extr}/\chi)C_p \Delta T$$

For a flowing liquid system, this FOM can be applied to select an optimized flowing heat capacity liquid medium just as it is used to select an optimized solid state heat capacity medium today. Lawrence Livermore National Laboratory is currently building a Nd:GGG solid state heat capacity laser with a temperature swing from 0 to 100 degrees C. For a Thionyl Chloride based system, the high end would be limited to about 70 degrees C., hence a $\Delta T$ of 70% of the solid state. However, the heat capacity of Thionyl Chloride is about twice as large as the heat capacity of GGG, and given the measured much lower quenching in that liquid system, the $\chi$ of GGG should be much lower. So if we pick architectures for both media to give the same $\epsilon_{extr}$, then the FOM for liquid systems can be expected at least to be typically on par with solid-state systems by this FOM. To compare between liquid and solid-state designs, the heat storage "off line" in the liquid reservoir must be factored in.

Hence for this type of system-to-system comparison (rather than purely material comparison of the above FOM), a second figure of merit (SFOM) is defined:

$$SFOM = (\epsilon_{extr}/\chi) C_p \Delta T((M_{in\ resonator} + M_{in\ reservoir})/M_{in\ resonator}).$$

This expression shows that system heat load performance is a strong function of the $M_{in\ reservoir}$. For the solid-state systems, this is equal to 0. In practical liquid heat capacity systems, $M_{in\ reservoir}$ can be easily made many times larger than $M_{in\ resonator}$ since these masses are small compared to overall system masses. This illustrates a key design advantage of a liquid design over a solid-state design.

3) For a high transverse flowing liquid gain media, operational considerations for the gain media within the laser media are no different whether it is operated in actively cooled (See U.S. Pat. No. 6,600,766B1, incorporated herein by reference) or heat capacity mode. This is due to the heat handling mechanism at the lasing zone being identical in each case, for bulk liquid flow. This is quite different from the solid-state case where thermal stresses are inverted between the two modes of operation (See U.S. Pat. No. 5,526,372, incorporated herein by reference). For the liquid state, there is no concept of bulk material fracture limits or optical distortion and losses from thermo-optically induced stress-birefringence.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

We claim:

1. A method of operating an optically pumped flowing liquid state laser gain medium in the heat capacity regime, comprising:

flowing a liquid state laser gain medium in a system comprising a reservoir and an optical pumping and lasing channel;

optically pumping said gain medium for a pumping period of time determined by $$\tau = \frac{(\varepsilon_{extr}/\chi) C_p \Delta T (M_{in\ resonator} + M_{in\ reservoir})}{P_{out}},$$

wherein $M_{in\ resonator}$ is the mass if said gain medium within said optical pumping and lasing channel, $M_{in\ reservoir}$ is the mass of said gain medium in the flow lines and reservoir external to said optical pumping and lasing channel, $C_p$ is the specific heat of said gain medium, $\Delta T$ is the bulk temperature change of the entirety of said gain medium during a heat capacity sequence, $P_{out}$ is the desired output power, $\epsilon_{extr}$ is the extraction efficiency and $\chi$ is the ratio of energy released as heat to the energy in the upper lasing level (giving gain) of said gain medium; and cooling said gain medium for a cooling period of time determined by $$\tau_{cool} = \frac{C_p \Delta T (M_{in\ resonator} + M_{in\ reservoir})}{Q_{cool}},$$

wherein cooling said gain medium is accomplished physically remote from said optical pumping and lasing channel, wherein $Q_{cool}$ is the average cooling rate of said gain medium.

2. The method of claim 1, wherein said cooling period of time is initiated after said pumping period of time.

3. The method of claim 1, wherein said pumping period of time followed by said cooling period of time comprises a cycle.

4. The method of claim 1, wherein said cooling step includes flowing coolant or liquid-to-gas refrigerant through a heat exchanger in said reservoir.

5. The method of claim 3, wherein said cycle is repeated at least once.

6. The method of claim 1, further comprising pre-cooling said gain medium prior to optically pumping said gain medium.

7. A method of operating an optically pumped flowing liquid state laser gain medium in the heat capacity regime, comprising:

flowing a liquid state laser gain medium in a system comprising a reservoir and an optical pumping and lasing channel;

optically pumping said gain medium for a pumping period of time determined by $$\tau = \frac{(\varepsilon_{extr}/\chi) C_p \Delta T (M_{in\ resonator} + M_{in\ reservoir})}{P_{out}},$$

wherein $M_{in\ resonator}$ is the mass of said gain medium within said optical pumping and lasing channel, $M_{in\ reservoir}$ is the mass of said gain lasing channel, $C_p$ is the specific heat of said gain medium, $\Delta T$ is the bulk temperature change of the entirety of said gain medium during a heat capacity sequence, $P_{out}$ is the desired output power, $\epsilon_{extr}$ is the extraction efficiency and $\chi$ is the ratio of energy released as heat to the energy in the upper lasing level (giving gain) of said gain medium; and cooling said gain medium for a cooling period of time determined by $$\tau_{cool} = \frac{C_p \Delta T (M_{in\ resonator} + M_{in\ reservoir})}{Q_{cool}},$$

wherein $Q_{cool}$ is the average cooling rate of said gain medium, wherein said gain medium is optically pumped with a pumping system selected from the group consisting of a laser diode array, a flash lamp, an arc lamp and a solar collector.

8. A method of operating an optically pumped flowing liquid state laser gain medium in the heat capacity regime, comprising:

flowing a liquid state laser gain medium in a system comprising a reservoir and an optical pumping and lasing channel;

optically pumping said gain medium for a pumping period of time determined by $$\tau = \frac{(\varepsilon_{extr}/\chi)C_p\Delta T(M_{in\,resonator}+M_{in\,reservoir})}{P_{out}},$$

wherein $M_{in\,resonator}$ is the mass of said gain medium within said optical pumping and lasing channel, $M_{in\,reservoir}$ is the mass of said gain medium in the flow lines and reservoir external to said optical pumping and lasing channel, $C_p$ is the specific heat of said gain medium, $\Delta T$ is the bulk temperature change of the entirety of said gain medium during a heat capacity sequence, $P_{out}$ is the desired output power, $\epsilon_{extr}$ is the extraction efficiency and $\chi$ is the ratio of energy released as heat to the energy in the upper lasing level (giving gain) of said gain medium; and cooling said gain medium for a cooling period of time determined by $$\tau_{cool} = \frac{C_p\Delta T(M_{in\,resonator}+M_{in\,reservoir})}{Q_{cool}},$$

wherein $Q_{cool}$ is the average cooling rate of said gain medium, wherein said gain medium in said optical pumping and lasing channel is not in thermal isolation.

9. A method of operating an optically pumped flowing liquid state laser gain medium in the heat capacity regime, comprising:

flowing a liquid state laser gain medium in a system comprising a reservoir and an optical pumping and lasing channel;

optically pumping said gain medium for a pumping period of time determined by $$\tau = \frac{(\varepsilon_{extr}/\chi)C_p\Delta T(M_{in\,resonator}+M_{in\,reservoir})}{P_{out}},$$

wherein $M_{in\,resonator}$ is the mass of said gain medium within said optical pumping and lasing channel, $M_{in\,reservoir}$ is the mass of said gain medium in the flow lines and reservoir external to said optical pumping and lasing channel, $C_p$ is the specific heat of said gain medium, $\Delta T$ is the bulk temperature change of the entirety of said gain medium during a heat capacity sequence, $P_{out}$ is the desired output power, $\epsilon_{extr}$ is the extraction efficiency and $\chi$ is the ratio of energy released as heat to the energy in the upper lasing level (giving gain) of said gain medium; and cooling said gain medium for a cooling period of time determined by $$\tau_{cool} = \frac{C_p\Delta T(M_{in\,resonator}+M_{in\,reservoir})}{Q_{cool}},$$

wherein $Q_{cool}$ is the average cooling rate of said medium, wherein said $\tau$ may, for fixed choice of said gain medium and for fixed said heat capacity regime resonator design, be made arbitrarily large by increasing value of said $M_{in\,reservoir}$.

10. A method of operating an optically pumped flowing liquid state laser gain medium in the heat capacity regime, comprising optically pumping this medium for a period of time determined by $$\tau = \frac{(\varepsilon_{extr}/\chi)C_p\Delta T(M_{in\,resonator}+M_{in\,reservoir})}{P_{out}},$$

where $M_{in\,resonator}$ is the liquid media within the optical pumping and lasing channel of the laser, $M_{in\,reservoir}$ is the liquid gain media in the flow lines and reservoir external to the laser action, $C_p$ is the specific heat of the liquid gain medium, $\Delta T$ is the bulk temperature change of the entirety of the liquid gain medium during the heat capacity sequence, $P_{out}$ is the desired output power of said laser, $\epsilon_{extr}$ is the laser system's extraction efficiency and $\chi$ is the ratio of energy released as heat to the energy in the upper lasing level (given gain), wherein the step of optically pumping includes optically pumping Nd dissolved in Thionyl Chloride; and precooling said liquid gain medium in said reservoir to a temperature below room temperature prior to said optical pumping step.

11. The method of claim 10 wherein the step of optical pumping includes optical pumping of the said flowing liquid state gain medium within the said lasing channel with a laser pump temporal format selected from a group consisting of Q-switched, mode-locked, cavity dumped, free-running and continuous-wave.

* * * * *